United States Patent
Panje et al.

(10) Patent No.: US 11,997,558 B2
(45) Date of Patent: May 28, 2024

(54) WIFI MULTI-ACCESS POINT-SSID MONITORING AND PROVISIONING ENHANCEMENTS

(71) Applicant: ARRIS Enterprises LLC, Suwanee, GA (US)

(72) Inventors: Krishna Prasad Panje, Karnataka (IN); Lakshmi Arunkumar, Karnataka (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 253 days.

(21) Appl. No.: 17/407,575

(22) Filed: Aug. 20, 2021

(65) Prior Publication Data
US 2022/0078691 A1   Mar. 10, 2022

Related U.S. Application Data

(60) Provisional application No. 63/076,640, filed on Sep. 10, 2020.

(51) Int. Cl.
*H04W 36/32* (2009.01)
*H04W 36/18* (2009.01)
*H04W 36/22* (2009.01)

(52) U.S. Cl.
CPC ......... *H04W 36/32* (2013.01); *H04W 36/18* (2013.01); *H04W 36/22* (2013.01)

(58) Field of Classification Search
None
See application file for complete search history.

(56) References Cited

U.S. PATENT DOCUMENTS

| | | | |
|---|---|---|---|
| 8,126,145 B1 * | 2/2012 | Tewari | H04W 12/50 370/428 |
| 8,644,822 B1 * | 2/2014 | Phillips | H04L 65/1063 455/433 |
| 8,937,927 B1 * | 1/2015 | Pularikkal | H04W 36/0016 370/349 |
| 9,674,187 B1 * | 6/2017 | Ngo | H04W 12/06 |
| 11,399,282 B1 * | 7/2022 | Tsai | H04L 61/50 |
| 2011/0280213 A1 * | 11/2011 | Calhoun | H04W 76/12 370/329 |
| 2014/0233386 A1 * | 8/2014 | Jamadagni | H04W 36/22 370/235 |

(Continued)

FOREIGN PATENT DOCUMENTS

CN    104602300 A  *  5/2015  ............ H04W 28/08

*Primary Examiner* — Kodzovi Acolatse
(74) *Attorney, Agent, or Firm* — Wenderoth, Lind & Ponack, L.L.P.

(57) ABSTRACT

It is common for device coupled to a primary network to have preferential access to network resources compared to a device coupled to a guest network. However, the quality of experience (QoE) is enhanced by providing automatic switching of a client device on a guest network to a primary network. The dynamic approach switches the network connection of a client device used by a guest user/client device from a guest network to a primary network based on one or more network conditions that are associated with the guest network, the primary network, or both. Seamlessly switching the client device to the primary network, when such does not impact existing users of the primary network, enhances the network experience of the client devices initially associated with the guest network.

20 Claims, 4 Drawing Sheets

(56) References Cited

U.S. PATENT DOCUMENTS

| | | | |
|---|---|---|---|
| 2017/0006504 A1* | 1/2017 | Townend | H04W 28/0257 |
| 2018/0006670 A1* | 1/2018 | Liu | H04W 72/0453 |
| 2018/0027463 A1* | 1/2018 | Chen | H04W 48/16 |
| | | | 370/331 |
| 2019/0028482 A1* | 1/2019 | Pallas | H04W 48/16 |
| 2019/0124706 A1* | 4/2019 | Huang | H04W 40/244 |
| 2020/0068483 A1* | 2/2020 | Likar | H04W 76/11 |
| 2020/0162917 A1* | 5/2020 | Anantha | H04W 12/069 |
| 2021/0352565 A1* | 11/2021 | Li | H04W 40/248 |
| 2022/0408330 A1* | 12/2022 | Vaidya | H04W 76/28 |
| 2023/0025898 A1* | 1/2023 | Kaplan | H04W 16/18 |
| 2023/0034345 A1* | 2/2023 | Javaudin | H04W 36/18 |
| 2023/0077413 A1* | 3/2023 | Jiao | H04B 17/318 |

* cited by examiner

WIFI MULTI-ACCESS POINT-SSID MONITORING AND PROVISIONING ENHANCEMENTS

BACKGROUND

Companies are increasingly providing Multiple Access Point (MAP) architecture or Home Network Controller (HNC) type of home Wi-Fi management, with multiple access point devices and/or extender access point devices within the home to improve Quality of Experience (QoE) of the user for various client devices by offering extended coverage with seamless roaming. Access point devices and extender access point devices communicate with client devices using one or more RF channels.

Configuration of access point devices and/or extender access point devices is increasingly requiring additional features and configurations to provide an enjoyable, controllable, and safe QoE for access to a network. Increasingly, network environments must be configured to provision network access to a different types of users using a variety of client devices without affecting the QoE of each of the different types of users.

In many environments, different types of users are provisioned with different types of access to the network, for example, such that trusted users and/or network devices are isolated from guest/untrusted users and/or network devices. The different types of users can be given different privileges based on the type of access to the network. For example, the client devices of certain users (such as employees, residents, etc.) can be provisioned with a primary access to the network while the client devices of other users (such as temporary employees or workers, guests, visitors, etc.) can be provisioned with a guest access to the network. However, those client devices with only guest access can experience unsatisfactory QoE, for example, roaming or other connection issues especially when the guest user associated with the client device requires an extended use of the network. Thus, certain users can have a poor QoE if relegated to a user type that does not provide a sufficient level of access to the network.

Therefore, there is a need to provide improved management of different types of users of a network such that the access to the network connection provided to the client device associated with the user can be altered to accommodate the different types of users and the differing needs of users without impacting the network requirements of other users, for example, users with a higher priority access to the network.

SUMMARY

According to aspects of the present disclosure there are provided novel solutions for dynamically controlling, configuring and/or maintaining access to a network by any number of types of users of a network environment. For example, a primary user can be provided access to a primary network of the network and a guest user can be provided access to a guest network of the network such that the primary user has a different level of access to the network than the guest user, such as the guest user may only be permitted to access certain access point devices and/or extender access point devices to connect to the network. The provided novel solutions include a dynamic approach to control, configure and/or manage user access to a network by dynamically switching the network connection of a client device used by a guest user from a guest network to a primary network based on one or more network conditions. The aspects of the present disclosure provide features that enhance the provisioning of access to a network (for example, home/residential network access point devices, wireless extender access point devices (Wi-Fi APs), Home Network Controller devices, wireless routers, mesh networking nodes (e.g., Wi-Fi EasyMesh systems), and the like so as to provide improved QoE for various users of the network.

An aspect of the present disclosure provides an access point device of a network for providing network access to a client device. The access point device comprises a memory storing one or more computer-readable instructions, and a processor configured to execute the one or more computer-readable instructions to provide, to the client device, network access to a guest network of the network with a guest simple service set identifier (SSID), monitor one or more network conditions, wherein the one or more network conditions comprise any of a connection duration, a roaming duration, a network load parameter, or a combination thereof, wherein the one or more network conditions are associated with a primary network with a primary SSID, the guest network, or both and switch the client device from the guest network to the primary network based, at least in part, on at least one of the one or more conditions.

In an aspect of the present disclosure, the guest SSID has an associated guest SSID connection threshold, and wherein the client device is switched based, at least in part on, a comparison of the guest SSID connection threshold and the connection duration.

In an aspect of the present disclosure, switching the client device from the guest network to the primary network comprises the processor configured to execute one or more further instructions to send a message to an application of the client device to cause the client device to connect to the primary SSID of the primary network, wherein the message comprises one or more primary network credentials.

In an aspect of the present disclosure, switching the client device from the guest network to the primary network comprises the processor configured to execute one or more further instructions to provide the client device with one or more features associated with the primary network, wherein the one or more features comprise any of a performance level, a priority level, a bandwidth level, a roaming level, a steering level, or a combination thereof.

In an aspect of the present disclosure, the network load parameter is indicative of a total number of client devices connected to the guest network, and wherein switching the client device from the guest network to the primary network is based, at least in part, on the network load parameter.

In an aspect of the present disclosure, the processor is configured to execute one or more further instructions to compare at least one of the one or more network conditions to a threshold associated with the at least one of the one or more network conditions, and disconnect the client device from the primary network based, at least in part, on the comparison.

In an aspect of the present disclosure, the processor is configured to execute one or more further instructions to determine that the client device is a trusted device and wherein the client device is switched based, at least in part on, the determination that the client device is a trusted device.

An aspect of the present disclosure provides a method for an access point device to provide a client device network access to a network. The method comprises providing, to the client device, network access to a guest network of the network with a guest simple service set identifier (SSID), monitoring one or more network conditions, wherein the one or more network conditions comprise any of a connection duration, a roaming duration, a network load parameter, or a combination thereof, wherein the one or more network conditions are associated with a primary network with a primary SSID, the guest network, or both, and switching the client device from the guest network to the primary network based, at least in part, on at least one of the one or more conditions.

In an aspect of the present disclosure, the method further comprises the guest SSID has an associated guest SSID connection threshold, and wherein the client device is switched based, at least in part on, a comparison of the guest SSID connection threshold and the connection duration.

In an aspect of the present disclosure, the method further comprises the method further comprises sending a message to an application of the client device to cause the client device to connect to the primary SSID of the primary network, wherein the message comprises one or more primary network credentials.

In an aspect of the present disclosure, the method further comprises the switching the client device from the guest network to the primary network comprises: providing the client device with one or more features associated with the primary network, wherein the one or more features comprise any of a performance level, a priority level, a bandwidth level, a roaming level, a steering level, or a combination thereof.

In an aspect of the present disclosure, the method further comprises the network load parameter is indicative of a total number of client devices connected to the guest network, and wherein switching the client device from the guest network to the primary network is based, at least in part, on the network load parameter.

In an aspect of the present disclosure, the method further comprises comparing at least one of the one or more network conditions to a threshold associated with the at least one of the one or more network conditions and disconnecting the client device from the primary network based, at least in part, on the comparison.

In an aspect of the present disclosure, the method further comprises the guest SSID has an associated guest SSID connection threshold, and wherein the client device is switched based, at least in part on, a comparison of the guest SSID connection threshold and the connection duration.

In an aspect of the present disclosure, the method further comprises sending a message to an application of the client device to cause the client device to connect to the primary SSID of the primary network, wherein the message comprises one or more primary network credentials.

In an aspect of the present disclosure, the method further comprises providing the client device with one or more features associated with the primary network, wherein the one or more features comprise any of a performance level, a priority level, a bandwidth level, a roaming level, a steering level, or a combination thereof.

In an aspect of the present disclosure, the method further comprises the network load parameter is indicative of a total number of client devices connected to the guest network, and wherein switching the client device from the guest network to the primary network is based, at least in part, on the network load parameter.

In an aspect of the present disclosure, the method further comprises comparing at least one of the one or more network conditions to a threshold associated with the at least one of the one or more network conditions, and disconnecting the client device from the primary network based, at least in part, on the comparison.

In an aspect of the present disclosure, the method further comprises determining that the client device is a trusted device, and wherein the client device is switched based, at least in part on, the determination that the client device is a trusted device.

An aspect of the present disclosure provides a non-transitory computer-readable medium of an access control device for storing a program to provide a client device access to a network. The program when executed by a processor of the access point device, causes the access point device to perform one or more operations including the steps of the methods described above.

The above-described novel solution may be implemented at an access point device of a network, such as a residential gateway, according to one or more example embodiments.

Thus, according to various aspects of the present disclosure described herein, it is possible to provide a centralized and dynamic provisioning of network access for any number of users of various client devices connected to a network. The novel solution described herein addresses the problem of QoE of a guest user that is initially given access to a guest network. In particular, the novel solution provides improvements for controlling access to a network by transitioning the client device of a guest user from a guest network to a primary network to provide better QoE.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
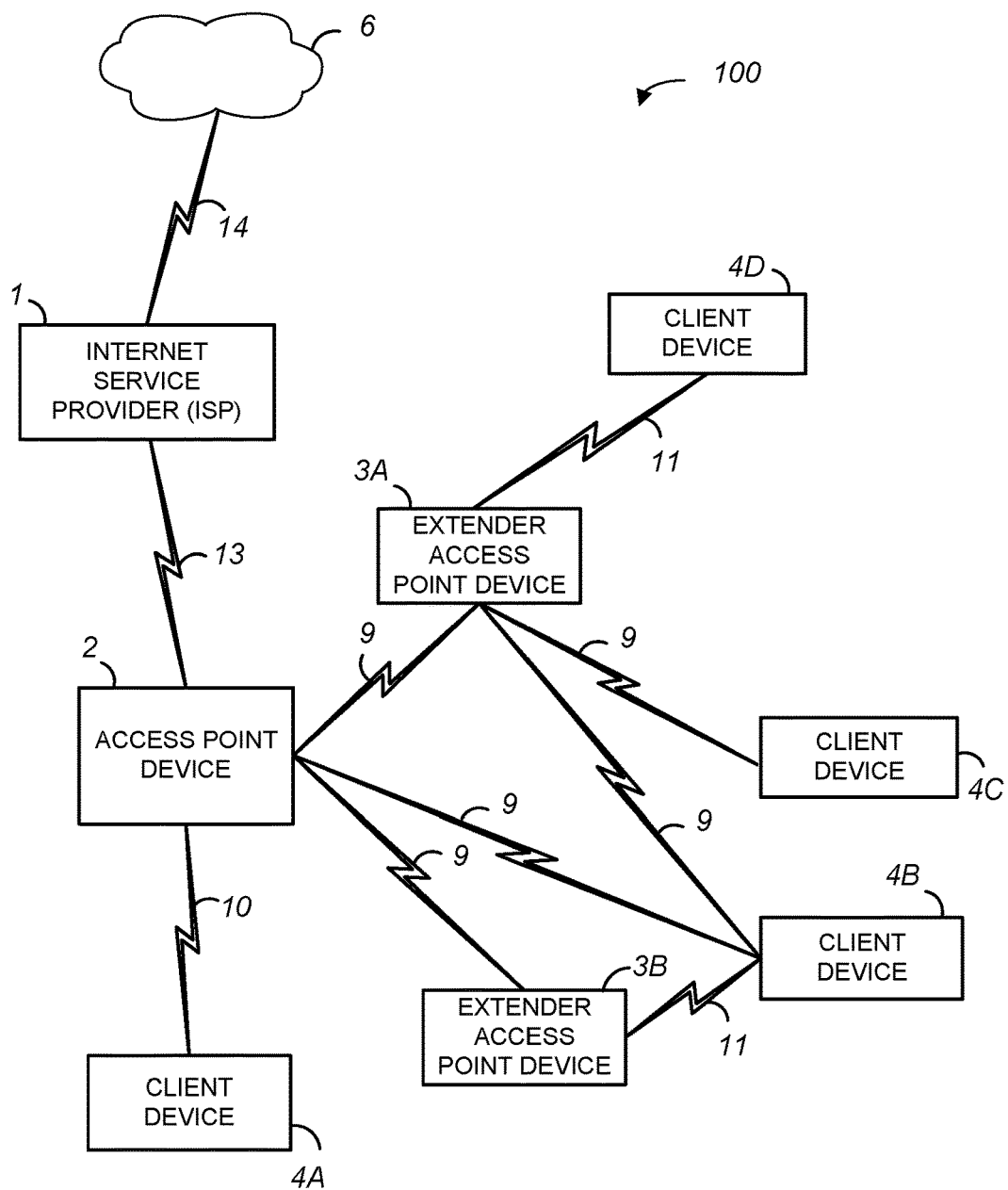
FIG. 1 is a schematic diagram of a system, according to one or more aspects of the present disclosure.

FIG. 1 is a schematic diagram of a system 100, according to one or more aspects of the present disclosure.

It should be appreciated that various example embodiments of inventive concepts disclosed herein are not limited to specific numbers or combinations of devices, and there may be one or multiple of some of the aforementioned electronic apparatuses in the system, which may itself consist of multiple communication networks and various known or future developed wireless connectivity technologies, protocols, devices, and the like.

As shown in FIG. 1, the main elements of the system 100 include an access point device 2 connected to the Internet 6 via an Internet Service Provider (ISP) 1 and also connected to different wireless devices such as one or more wireless extender access point devices 3A and 3B (collectively referred to as extender access point device(s) 3) and one or more client devices 4A, 4B, 4C and 4D (collectively referred to as client device(s) 4). The system 100 shown in FIG. 1 includes wireless devices (e.g., extender access point devices 3 and client devices 4) that may be connected in one or more wireless networks (e.g., private, guest, iControl, backhaul network, or Internet of things (IoT) network) within the system 100. Additionally, there could be some overlap between wireless devices (e.g., extender access point devices 3 and client devices 4) in the different networks. That is, one or more network or wireless devices could be located in more than one network. For example, the extender access point devices 3 could be located both in a private network for providing content and information to any of client devices 4 and also included in a backhaul network or an iControl network.

Starting from the top of FIG. 1, the ISP 1 can be, for example, a streaming content or asset provider or any computer for connecting the access point device 2 to the Internet 6 for access to an asset. An asset can include, but is not limited to, any of an application, a program, a login, a directory, a file structure, a device setting and/or configuration, data, content (for example, audio content, video content, and/or audio/video content), any other information received from ISP 1, or a combination thereof. The connection 14 between the Internet 6 and the ISP 1 and the connection 13 between the ISP 1 and the access point device 2 can be implemented using a wide area network (WAN), a virtual private network (VPN), a metropolitan area networks (MAN), a system area networks (SAN), a data over cable service interface specification (DOCSIS) network, a fiber optics network (e.g., FTTH (fiber to the home) or FTTX (fiber to the x), or a hybrid fiber-coaxial (HFC)), a digital subscriber line (DSL), a public switched data network (PSDN), a global Telex network, or a 2G, 3G, 4G, 5G, or 6G network, for example.

The connection 13 can further include as some portion thereof a broadband mobile phone network connection, an optical network connection, or other similar connections. For example, the connection 13 can also be implemented using a fixed wireless connection that operates in accordance with, but is not limited to, 3rd Generation Partnership Project (3GPP) Long Term Evolution (LTE), 5G, or 6G protocols. It is also contemplated by the present disclosure that connection 13 is capable of providing connections between the access point device 2 and a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G or 6G network, for example.

The access point device 2 can be, for example, an access point and/or a hardware electronic device that may be a combination modem and gateway, such as a residential gateway, that combines the functions of a modem, an access point (AP), and/or a router for providing content received from the ISP 1 to network devices (e.g., wireless extender access point devices 3 and client devices 4) in the system 100. It is also contemplated by the present disclosure that the access point device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content. The access point device 2 may also be referred to as a residential gateway, a home network gateway, or a wireless access point (AP). Further, an access point device 2 can be an electronic device that includes an application or software that controls, configures and/or manages access to the network by any client device 4 as described with reference to, for example, FIGS. 2, 3A, 3B, 3C, and 4. For example, the access point device 2 can provide different levels of access to the network by a client device 4 such that certain client devices 4 are allowed access to a primary network of the network while other client devices 4 are allowed access only to a guest network of the network. The access point device 2 can provision a client device 4 to connect to the network using a particular service set identifier (SSID), such as a guest SSID (so as to allow access to the guest network) or a primary SSID (so as to allow access to the primary network). The access point device 2 can also alter or switch the level of access of a client device 4 based on one or more network conditions as discussed below. For example, client devices 4A and 4B can be provisioned using a primary SSID while client devices 4C and 4D can be provisioned using a guest SSID, where the primary SSID and the guest SSID have different levels of access to the network. In the example illustrated in FIG. 1, client devices 4A and 4B can access or connect to access point device 2 directly or indirectly via any extender access point device 3. In contrast, client device 4C and 4D can only access or connect to access point device 2 via extender access point device 3A. The guest SSID provides a level of access to the network for client devices 4C and 4D only through designated extender access point devices 3 (such as extender access point device 3A) while the primary SSID provides a level of access to the network for client devices 4A and 4B that is not limited to any particular type of connection (direct or indirect) or any particular extender access point device 3 (such a extender access point devices 3A and 3B). As discussed throughout, the primary SSID can provide different levels of access to the network than the guest SSID including, but not limited to, any of bandwidth, routing, connection speed, roaming capability, connection duration, connectivity priority, any other network condition, or a combination thereof. While FIG. 1 illustrates client device 4A connected directly to access point device 2, the present disclosure contemplates that any client device 4 can connect directly to the access point device 2 via a guest network or a primary network depending on the level of access of the client device 4.

The connection 9 between the access point device 2, the wireless extender access point devices 3, and client devices 4 can be implemented using a wireless connection in accordance with any IEEE 802.11 Wi-Fi protocols, Bluetooth protocols, Bluetooth low energy (BLE), or other short range protocols that operate in accordance with a wireless technology standard for exchanging data over short distances using any licensed or unlicensed band such as the citizens broadband radio service (CBRS) band, 2.4 GHz bands, 5

GHz bands, 6 GHz, or 60 GHz bands. Additionally, the connection 9 can be implemented using a wireless connection that operates in accordance with, but is not limited to, RF4CE protocol, ZigBee protocol, Z-Wave protocol, or IEEE 802.15.4 protocol. It is also contemplated by the present disclosure that the connection 9 can include connections to a media over coax (MoCA) network. One or more of the connections 9 can also be a wired Ethernet connection. Any one or more of connections 9 can carry information associated with an asset, for example, content received from and/or communicated to ISP 1.

The extender access point devices 3 can be, for example, wireless hardware electronic devices such as access points (APs), extenders, repeaters, etc. used to extend the wireless network by receiving the signals transmitted by the access point device 2 and rebroadcasting the signals to, for example, client devices 4, which may be out of range of the access point device 2. The extender access point devices 3 can also receive signals from the client devices 4 and rebroadcast the signals to the access point device 2, or other client devices 4. Extender access point devices 3A and 3B can provide access to the network via a guest network, a primary network or both. While FIG. 1 illustrates a direct connection between extender access point devices 3 and the access point device 2, the present disclosure contemplates an indirect connection as well, for example, via an additional extender access point device 3.

The connections 11 between the extender access point devices 3 and the client devices 4 are implemented through a wireless connection that operates in accordance with any IEEE 802.11 Wi-Fi protocols, Bluetooth protocols, BLE, or other short range protocols that operate in accordance with a wireless technology standard for exchanging data over short distances using any licensed or unlicensed band such as the CBRS band, 2.4 GHz bands, 5 GHz bands, 6 GHz, or 60 GHz bands. Additionally, the connection 11 can be implemented using a wireless connection that operates in accordance with, but is not limited to, RF4CE protocol, ZigBee protocol, Z-Wave protocol, or IEEE 802.15.4 protocol. Also, one or more of the connections 11 can be a wired Ethernet connection.

The client devices 4 can be, for example, hand-held computing devices, personal computers including, but not limited to, any of a desktop computer or a laptop, an electronic tablet, a mobile phone, a smart phone, a smart speaker, an IoT device, an iControl device, a portable music player with smart capabilities capable of connecting to the Internet, a cellular network, and/or interconnecting with other devices via Wi-Fi and/or Bluetooth, other wireless hand-held consumer electronic devices capable of executing and displaying information received through the access point device 2, or any combination thereof. Additionally, the client devices 4 can be a television (TV), an IP/QAM set-top box (STB) or a streaming media decoder (SMD) that is capable of decoding audio/video content, and playing over OTT or MSO provided content received through the access point device 2.

The connection 10 between the access point device 2 and the client device 4 can be implemented through a wireless connection that operates in accordance with, but is not limited to, any IEEE 802.11 protocols. Additionally, the connection 10 between the access point device 2 and the client device 4 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The connection 10 can also be implemented using a wireless connection in accordance with Bluetooth protocols, BLE, or other short range protocols that operate in accordance with a wireless technology standard for exchanging data over short distances using any licensed or unlicensed band such as the CBRS band, 2.4 GHz bands, 5 GHz bands, 6 GHz or 60 GHz bands. One or more of the connections 10 can also be a wired Ethernet connection. In one or more embodiments, connection 10 can be limited to client devices 4 that connect using a primary SSID (such as client device 4A). In one or more embodiments, connection 10 can connect any one or more client devices 4 to a primary network, a guest network or both.

Figure 2:
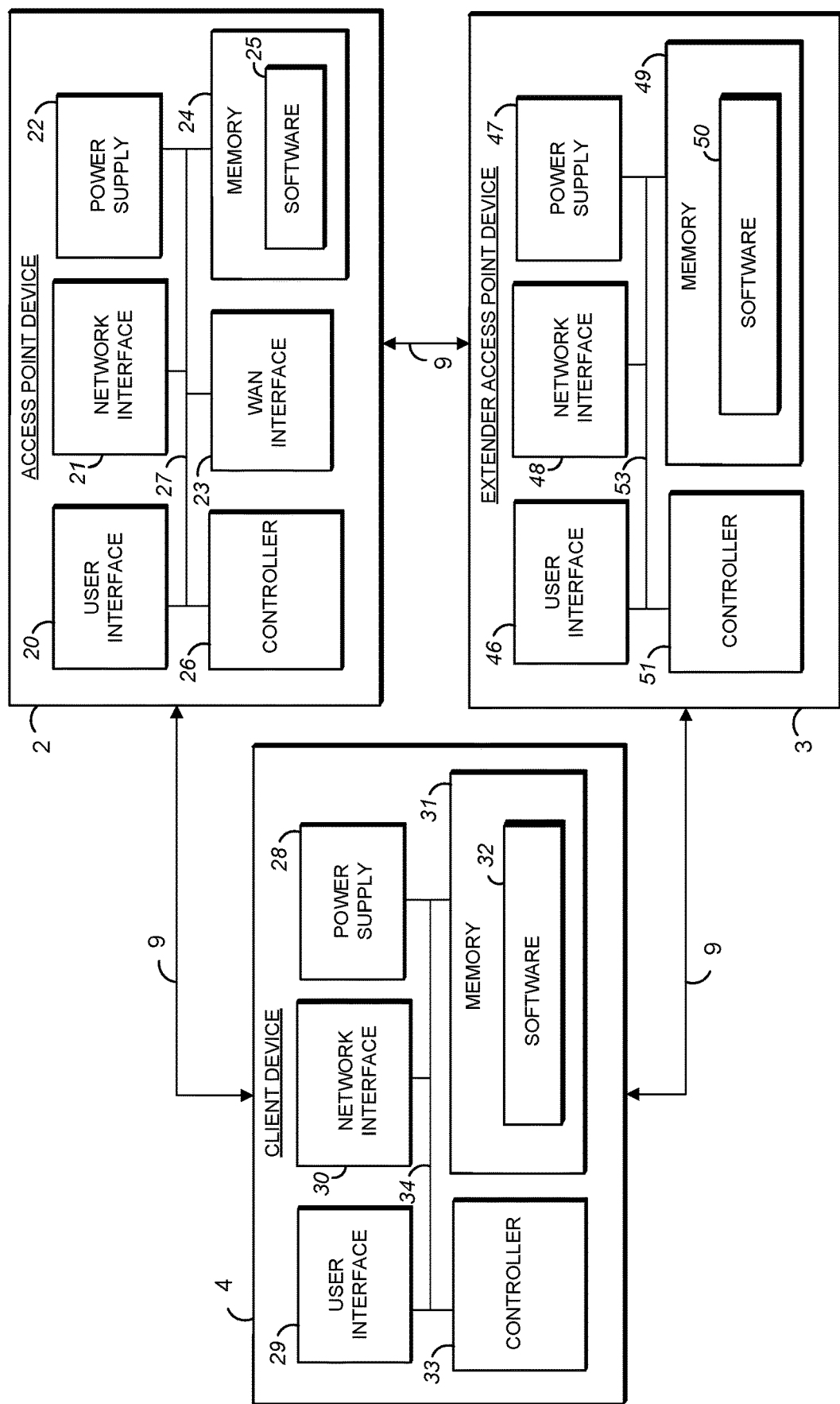
FIG. 2 is a more detailed block diagram illustrating various components of an exemplary access point device, client device, and extender access point device implemented in the system of FIG. 1, according to one or more aspects of the present disclosure.

A detailed description of the exemplary internal components of the access point device 2, the extender access point devices 3, and the client devices 4 shown in FIG. 1 will be provided in the discussion of FIG. 2. However, in general, it is contemplated by the present disclosure that the access point device 2, the extender access point devices 3, and the client devices 4 include electronic components or electronic computing devices operable to receive, transmit, process, store, and/or manage data and information associated with the system 100, which encompasses any suitable processing device adapted to perform computing tasks consistent with the execution of computer-readable instructions stored in a memory or a computer-readable recording medium (e.g., a non-transitory computer-readable medium).

Further, any, all, or some of the computing components in the access point device 2, the extender access point devices 3, and the client devices 4 may be adapted to execute any operating system, including Linux, UNIX, Windows, MacOS, DOS, and ChromOS as well as virtual machines adapted to virtualize execution of a particular operating system, including customized and proprietary operating systems. The access point device 2, the extender access point devices 3, and the client devices 4 are further equipped with components to facilitate communication with other computing devices over the one or more network connections to local and wide area networks, wireless and wired networks, public and private networks, and any other communication network enabling communication in the system 100.

FIG. 2 is a more detailed block diagram illustrating various components of an exemplary access point device 2, client device 4, and wireless extender access point device 3 implemented in the system of FIG. 1, according to one or more aspects of the present disclosure.

Although FIG. 2 only shows one extender access point device 3 and one client device 4, the extender access point device 3 and the client device 4 shown in the figure are meant to be representative of the other extender access point devices 3 and client devices 4 of a network system, for example, system 100 shown in FIG. 1, 3A, 3B, or 3C. Similarly, the connections 9 between the access point device 2, the extender access point device 3, and the client device 4 shown in FIG. 2 are meant to be exemplary connections and are not meant to indicate all possible connections between the access point devices 2, extender access point devices 3, and client devices 4. Additionally, it is contemplated by the present disclosure that the number of access point devices 2, extender access point devices 3, and client devices 4 is not limited to the number of access point devices 2, extender access point devices 3, and client devices 4 shown in FIGS. 1, 2, 3A, 3B, and 3C.

Now referring to FIG. 2 (e.g., from left to right), the client device 4 can be, for example, any device as discussed with reference to FIG. 1, including, but not limited to, a computer, a portable device, an electronic tablet, an e-reader, a PDA, a mobile phone such as a smart phone, a smart speaker, an IoT device, an iControl device, a portable music player with smart capabilities capable of connecting to the Internet, cellular networks, and interconnecting with other devices via Wi-Fi and Bluetooth, or other wireless hand-held consumer electronic device capable of executing and displaying the content received through the access point device 2. Additionally, the client device 4 can be a TV, an IP/QAM STB, or an SMD that is capable of decoding audio/video content, and playing over OTT or MSO provided content received through the access point device 2.

As shown in FIG. 2, the client device 4 includes a power supply 28, a user interface 29, a network interface 30, a memory 31, and a controller 33.

The power supply 28 supplies power to the internal components of the client device 4 through the internal bus 34. The power supply 28 can be a self-contained power source such as a battery pack with an interface to be powered through an electrical charger connected to an outlet (e.g., either directly or by way of another device). The power supply 28 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The user interface 29 includes, but is not limited to, any of a biometric scanning device, push buttons, a camera, a keyboard, a keypad, a liquid crystal display (LCD), a thin film transistor (TFT), a light-emitting diode (LED), a high definition (HD) or other similar display device including a display device having touch screen capabilities so as to allow interaction between one or more users and the client device 4, or a combination thereof. For example, the client device 4 may be used or shared at various times by multiple users. Client device 4 may comprise one or more profiles associated with one or more users such that certain users are provided access to a primary network while other user are provided access to a guest network based, at least in part, on the associated profile. In one or more embodiments, the user interface 29 may be external to the client device 4, for example, an external camera and/or scanner communicatively coupled to the client device 4.

The network interface 30 can include, but is not limited to, various network cards, interfaces, and circuitry implemented in software and/or hardware to enable communications with the access point device 2 and the extender access point device 3 using the communication protocols in accordance with connection 9 (e.g., as described with reference to FIG. 1). For example, the network interface card 30 allows for communication between the client device 4 and the access point device 2 as discussed with reference to FIGS. 3A, 3B, 3C and 4. As shown, network interface card 30 allows for direct communication with access point device 2 and indirect communication with access point device 2 via expander access point device 3. Client device 4 can be granted a level of access to the network (such as to a primary network or a guest network) by the access point device 2 based on one or more factors including, but not limited to, any of type of user (for example, a user profile), one or more user credentials (for example, a username, a password, or both), a time/date, a network load, a network bandwidth, a number of connected devices and/or users, a unique identifier associated with the client device 4, any other network, user and/or device criteria, or a combination thereof.

The memory 31 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software, or algorithms including software 32 for controlling the general function and operations of the client device 4 in accordance with the embodiments described in the present disclosure. In one or more embodiments, client device 4 is an electronic device shared between multiple users, and software 32 includes one or more applications and/or instructions for establishing a connection with the access point device 2 and the extender access point device 3 so as to access ISP 1.

The controller 33 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software including the software 32 for controlling the operation and functions of the client device 4 in accordance with the embodiments described in the present disclosure. Communication between the components (e.g., 28-31 and 33) of the client device 4 may be established using an internal bus 34.

The extender access point device 3 can be, for example, any wireless hardware electronic device used to extend a wireless network by receiving the signals transmitted by the access point device 2 and rebroadcasting the signals to one or more client devices 4, which may be out of range of the access point device 2 including, but not limited to, a wireless extender, a repeater, and/or an AP. The extender access point device 3 can also receive signals from any one or more of the client devices 4 and rebroadcast the signals to the access point device 2, mobile device 5, or any other one or more client devices 4.

As shown in FIG. 2, the extender access point device 3 includes a user interface 46, a power supply 47, a network interface 48, a memory 49, and a controller 51.

The user interface 46 can include, but is not limited to, push buttons, a keyboard, a keypad, an LCD, a TFT, an LED, an HD or other similar display device including a display device having touch screen capabilities so as to allow interaction between a user and the extender access point device 3.

The power supply 47 supplies power to the internal components of the wireless extender access point device 3 through the internal bus 53. The power supply 47 can be connected to an electrical outlet (e.g., either directly or by way of another device) via a cable or wire.

The network interface 48 can include various network cards, interfaces, and circuitry implemented in software and/or hardware to enable communications with the client device 4 and the access point device 2 using the communication protocols in accordance with connection 9 (e.g., as described with reference to FIG. 1). For example, the network interface 48 can include multiple radios or sets of radios (e.g., a 2.4 GHz radio, one or more 5 GHz radios, and/or a 6 GHz radio), which may also be referred to as wireless local area network (WLAN) interfaces. One radio or set of radios (e.g., 5 GHz and/or 6 GHz radio(s)) provides a backhaul connection between the wireless extender access point device 3 and the access point device 2, and optionally other wireless extender access point device(s) 3. Another radio or set of radios (e.g., 2.4 GHz, 5 GHz, and/or 6 GHz radio(s)) provides a fronthaul connection between the extender access point device 3 and one or more client device(s) 4.

The memory 49 can include a single memory or one or more memories or memory locations that include, but are not limited to, a RAM, a DRAM, a memory buffer, a hard drive, a database, an EPROM, an EEPROM, a ROM, a flash memory, logic blocks of an FPGA, hard disk or any other various layers of memory hierarchy. The memory 49 can be used to store any type of instructions, software, or algorithm including software 50 associated with controlling the general functions and operations of the wireless extender access point device 3 in accordance with the embodiments described in the present disclosure.

The controller 51 controls the general operations of the wireless extender access point device 3 and can include, but is not limited to, a CPU, a hardware microprocessor, a hardware processor, a multi-core processor, a single core processor, an FPGA, a microcontroller, an ASIC, a DSP, or other similar processing device capable of executing any type of instructions, algorithms, or software for controlling the operation and functions of the wireless extender access point device 3 in accordance with the embodiments described in the present disclosure. General communication between the components (e.g., 46-49 and 51) of the extender access point device 3 may be established using the internal bus 53.

The access point device 2 can be, for example, a hardware electronic device that can combine one or more functions of any of a modem, a gateway (for example, a residential gateway), an access point (AP), a router, or combinations thereof for providing an asset received from the asset provider via (ISP) 1 to network or wireless devices (e.g., extender access point devices 3, client devices 4) in the system, for example, system 100 of FIG. 1. It is also contemplated by the present disclosure that the access point device 2 can include the function of, but is not limited to, an IP/QAM STB or SMD that is capable of decoding audio/video content, and playing OTT or MSO provided content.

As shown in FIG. 2, the access point device 2 includes a user interface 20, a network interface 21, a power supply 22, a wide area network (WAN) interface 23, a memory 24, and a controller 26.

The user interface 20 can include, but is not limited to, push buttons, a keyboard, a keypad, an LCD, a TFT, an LED, an HD or other similar display device including a display device having touch screen capabilities so as to allow interaction between a user and the access point device 2.

The network interface 21 may include various network cards, and circuitry implemented in software and/or hardware to enable communications with the extender access point device 3 and the client device 4 using the communication protocols in accordance with connection 9 (e.g., as described with reference to FIG. 1). Additionally, the various network cards, interfaces, and circuitry of the network interface 21 enable communications with a client device 4 (e.g., a mobile device) using the one or more communication protocols in accordance with connection 10 (e.g., as described with reference to FIG. 1). For example, the network interface 21 can include an Ethernet port (also referred to as a LAN interface) and multiple radios or sets of radios (e.g., a 2.4 GHz radio, one or more 5 GHz radios, and/or a 6 GHz radio, also referred to as WLAN interfaces). One radio or set of radios (e.g., 5 GHz and/or 6 GHz radio(s)) provides a backhaul connection between the access point device 2 and the wireless extender access point device(s) 3. Another radio or set of radios (e.g., 2.4 GHz, 5 GHz, and/or 6 GHz radio(s)) provides a fronthaul connection between the access point device 2 and one or more client devices 4.

The power supply 22 supplies power to the internal components of the access point device 2 through the internal bus 27. The power supply 22 can be connected to an electrical outlet (e.g., either directly or by way of another device) via a cable or wire.

The wide area network (WAN) interface 23 may include various network cards, and circuitry implemented in software and/or hardware to enable communications between the access point device 2 and the ISP 1 using the wired and/or wireless protocols in accordance with connection 13 (e.g., as described with reference to FIG. 1).

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be a non-transitory computer-readable storage medium used to store any type of instructions, software, or algorithm including software 25 for controlling the general functions and operations of the access point device 2 and performing management functions related to the other devices (wireless extender access point devices 3 and client devices 4) in the network in accordance with the embodiments described in the present disclosure (e.g., including a dynamic switching of one or more client devices 4 from a guest network to a primary network, according to some example embodiments of the present disclosure).

The controller 26 controls the general operations of the access point device 2 as well as performs management functions related to the other devices (wireless extender access point devices 3 and client device 4) in the network. The controller 26 can include, but is not limited to, a central processing unit (CPU), a network controller, a hardware microprocessor, a hardware processor, a multi-core processor, a single core processor, a FPGA, a microcontroller, an ASIC, a DSP, or other similar processing device capable of executing any type of instructions, algorithms, or software including the software 25 for controlling the operation and functions of the access point device 2 in accordance with the embodiments described in the present disclosure including, but not limited to, an access control function to control access to one or more assets by the client device 4. Communication between the components (e.g., 20-26) of the access point device 2 may be established using the internal bus 27. The controller 26 may also be referred to as a processor, generally.

The software 25 can comprise one or more computer-readable instructions that cause the access point device to provide access or provision one or more client devices 4 so as to control the level of access of the one or more client devices 4 to the network. A network can comprise a primary network and a guest network where each has one or more network features and where access to each can be controlled by the access point device 2. For example, if a user of client device 4 has only guest credentials and/or a guest user profile and/or the client device is determined to be a guest or non-trusted network device, access point device 2 can provision the client device 4 to have only access to the guest network with a guest SSID but if the user of client device 4 is recognized by access point device 2 as a primary user (for example, based on one or more credentials, a user profile, a unique identifier associated with the client device 4, or a combination thereof), access point device 2 can provision client device 4 to have access to the primary network with a primary SSID. Connections associated with the guest SSID can have restricted access or privileges compared to those connections associated with the primary SSID. For example, one or more client devices 4 that connect to the primary network of the network with a primary SSID can have priority to network resources over those client device 4 that connect to the guest network of the network with a guest SSID. For example, client device 4 connected to the primary network can have priority to streaming services over client devices 4 connected to the guest network. In another example, client devices 4 connected to the guest network can be blocked from streaming an asset or content. The primary network can provide to a client device 4 improved or enhanced one or more features including, but not limited to, a performance level or preference, a priority level, access to one or more network applications or services, a bandwidth level, a roaming level, a steering level or a combination thereof over those provided to a client device 4 connected to the guest network. For example, referring to FIG. 1, a client device 4B connected to the primary network will have priority access to transmit and/or receive data via extender access point device 3A over that of client device 4C that is connected to the guest network via extender access point device 3A.

Figure 3A:
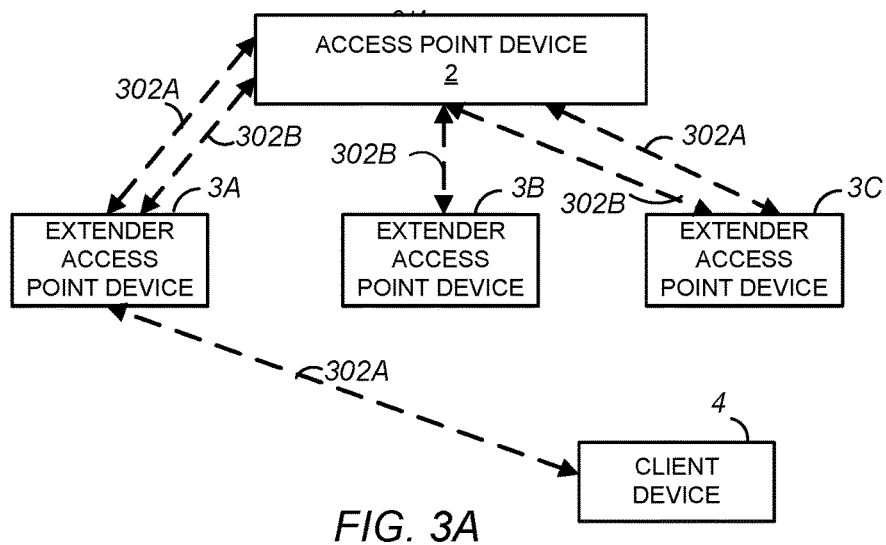
FIGS. 3A, 3B, and 3C illustrate switching network access of a client device, according to one or more aspects of the present disclosure.
Figure 3B:
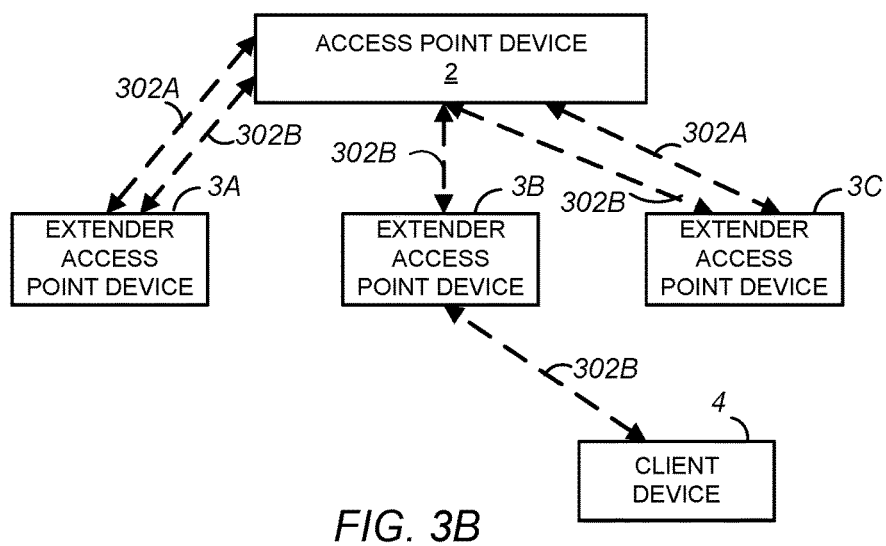
Figure 3C:
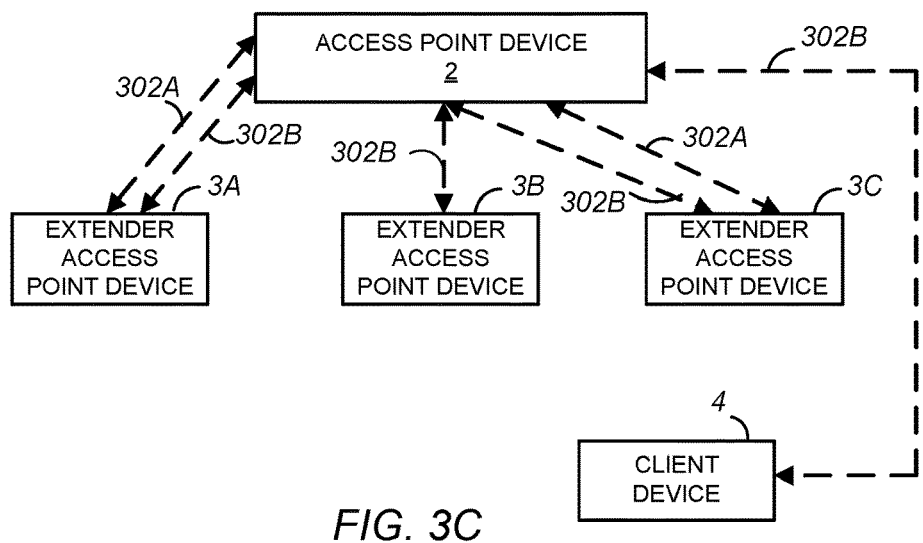

FIGS. 3A, 3B, and 3C illustrate switching a client device 4 from a guest network 302A to a primary network 302B, collectively referred to as network 302, according to one or more aspects of the present disclosure.

As shown in FIG. 3A, the access point device 2 is coupled to extender access point devices 3A, 3B and 3C. The network 302 can comprise a guest network 302A and a primary network 302B. While FIGS. 3A, 3B and 3C illustrate a single client device 4, the present disclosure contemplates any number of client devices 4 coupled to any of the guest network 302A, the primary network 302B, or both.

A user can access network 302 via a client device 4 by, for example, any of entering one or more credentials at a user interface of client device 4, selecting a user profile using a user interface of client device 4, accessing a client device associated with the network 302, using any other access or authentication methods, or any combination thereof. In one or more embodiments, client device 4 or a user of client device 4 can be recognized by access point device 2 such that client device 4 is automatically granted a certain level of access. For example, a client device 4 in a network environment, such as system 100 of FIG. 1, can be associated with a primary network 302B or a guest network 302A such that upon discovery of the client device 4, the access point device 2 automatically connects, provisions or associates the client device 4 to a primary network 302B with a primary SSID or to a guest network 302A with a guest SSID. In another example, a user of the client device 4 can request access to guest network 302A with a guest SSID or the primary network 302B with a primary SSID. Differentiating the network 302 into a guest network 302A and a primary network 302B allows trusted users and/or trusted client devices 4 of the network 302 to obtain access to the network 302 without continuously having to enter credentials, passwords, or any other authentication identifiers.

Access point device 2 can grant access to the client device 4 to the primary network 302B or the guest network 302A based on one or more factors including, but not limited to, any of type of user and/or one or more user credentials, a time/date, a network load, a network bandwidth, a number of connected devices and/or users, a unique identifier associated with the client device 4, any other network, user or device criteria and/or authentication parameter, or a combination thereof. The type of user can be a "guest" or a "primary" user, for example. In a home network environment, a "guest" or "visitor" may be given the necessary credentials or information to access the guest network 302A. For example, the password for the guest network 302A and the primary network 302B can be different such that trusted client devices 4 that are associated with the home network environment can store the primary network password or credentials so that a user of the trusted client device 4 does not have to repeatedly log in every time the trusted client device 4 is used in the home environment even though the guest password associated with the guest network 302A is routinely changed. In contrast, a user not associated with the home network environment such as visitor or a friend, can be required to enter a password or one or more credentials that only allows access to the guest network 302B where the password or one or more credentials can be changed periodically without affecting the QoE of any trusted client device 4. Similarly, in an office environment, public and/or private venue environment, certain users and/or client device(s) 4 can be identified as trusted such that the access point device 2 provides the client device(s) 4 network access to the primary network 302B while all other users and/or client device(s) 4 are provided only network access to the guest network 302A.

In one or more embodiments, a client device 4 installs or loads an application before attempting to connect to the network 302. For example, access point device 2 can send a request to the client device 4 to install an application. The application can be a software 32 that provides for communication with the access point device 2 so as to provision the client device 4 and/or to receive requests/instructions from the access point device 2 regarding switching the client device 4 from one network to another.

Referring back to FIG. 3A, client device 4 initially only has access to the network 302 via extender access point device 3A over a guest network 302A. In one or more embodiments, the access point device 2 determines that the client device 4 is a trusted device based, at least in part, on any of one or more network conditions (for example, duration of connectivity), a unique identifier associated with the client device 4, a user profile, a user notification indicating that the client device 4 should be treated as a trusted device, one or more connection patterns associated with the client device 4, any other indication or criteria determined by a user, for example, a system administer, and/or device, or any combination thereof.

For example, access point device 2 can monitor one or more network conditions associated with primary network 302B and/or guest network 302A to determine if the client device 4 should be or can be switched from the guest network 302A to the primary network 302B. The one or more network conditions can be associated with any of each extender access point device 3, for example, within connectivity range of the client device 4, the primary network 302B, the guest network 302A, or any combination thereof. The one or more network conditions can comprise any of a connection duration, a network activity or access level, a roaming parameter, a network load parameter, any other network condition or parameter, or a combination thereof. The connection duration, for example, can be indicative of the duration of time as detected by the access point device 2 that a client device 4 has been connected to the network 302 via the guest network 302A or the primary network 302B. A roaming parameter can be indicative of a duration of time that a client device 4 has been detected by the access point device 2 as seeking a connection to the network 302 at the access point device 2 or at any one or more extender access point devices 3, a number of times that client device 4 has attempted access to any network device within the network, any other roaming parameter, or a combination thereof. A network load parameter can be indicative of any of the network traffic load associated with any of one or more extender access point devices 3, the guest network 302A, the primary network 302B, or a combination thereof, the total number of client devices 4 (or network devices) connected to the guest network 302A or the primary network 302B, or any combination thereof. For example, the access point device 2 can determine to switch the client device 4 to the primary network 302B based on a determination that the network load parameter is at, exceeds, or both a network load threshold.

For example, an extender access point devices 3A and 3C can carry data on a guest network 302A with a guest SSID and a primary network 302B with a primary SSID. Extender access point device 3B can be designated only for primary network 302B so as to provide priority to users/devices granted access to the primary network 302B. The client device 4, in this example, is provided access by the access point device 2 to the guest network 302A and can send and/or receive data via extender access point device 3A. Data or traffic on guest network 302A is subordinated to data or traffic on primary network 302B such that client device 4 may experience slow response times, intermittent connectivity and/or any other network issues which can impact the QoE of a user of client device 4 should other network devices connect to the access point device 2 via extender access point device 3A via the primary network 302B or the guest network 302A. Client device 4 can roam the network 302 in an attempt to make a more efficient connection to the network 302. However, due to connection restrictions, for example, security restrictions, on the guest network 302B, client device 4 is not permitted to switch automatically to extender access point device 3B even if extender access point 3B has no other connections to any other network devices and/or is closer in proximity to client device 4.

According to one or more aspects of the present disclosure, access point device 2 can monitor one or more network conditions associated with the client device 4. Based on one or more network conditions, the access point device 2 can determine that the client device 4 should be provided access to the primary network 302B. For example, access point device 2 can compare a guest SSID connection threshold to the connection duration associated with the client device 4. The guest SSID connection threshold can be any value that indicates a threshold connection duration of any device to the guest network 302A. If the connection duration associated with the client device 4 is at, above or both the guest SSID connection threshold, the access point device 2 can determine that the client device 4 is a trusted user and/or client device 4 and can switch the client device 4 to the primary network 302B as illustrated in FIG. 3B. For example, a visitor to a home network environment can have an extended stay of several days. While typically a visitor using a client device 4 would only be provided access to the guest network 302A with a guest SSID so that the visitor does not affect the performance of other users on the primary network 302B with a primary guest SSID, if the guest SSID connection threshold is set to, for example, twenty-four hours, the access point device 2 can automatically switch the visitor using client device 4 to the primary network 302B without the visitor having to enter any new credentials or password. Such seamless transition to the primary network 302B provides an enhanced QoE to a visitor or guest user without requiring any manual time or effort (user intervention) and without requiring the any credentials or passwords associated with the primary network 302B be changed.

In one or more embodiments, as illustrated in FIG. 3C, the access point device 2 can switch the client device 4 to have a direct connection to the access point device 2 via the primary network 302B based, at least in part, on any one or more network conditions. For example, the access point device 2 can determine that the network load at extender access point devices 3A and 3C exceeds a network load threshold and thus switches the client device 4 to a direct connection to the access point device 2 on the primary network 302B.

Controlling access to a network environment, for example, system 100 of FIG. 1, while also providing enhanced QoE usually requires manual intervention, for example, by an administrator. Often, trusted client devices 4 are provided access to a primary network 302B whereas guests using non-trusted client devices 4 are provided access to a guest network 302A. However, a guest can experience an unsatisfactory QoE if, for example, the guest requires access to the network 302 for an extended duration. Providing the guest, though, with access to the primary network 302B can lead to security issues and/or typically requires that the password and/or the network credentials associated with the primary network 302B be routinely updated or changed which poses a burden on all client devices 4 connected to the primary network 302B as each will need to re-establish a connection with the primary network 302B after each update. Therefore, there is a need to provide automatic switching of a client device 4 connected to a guest network 302A to a primary network 302B based on one or more conditions without requiring any burden on those client devices 4 previously connected to the primary network 302B. This novel solution of automatic switching of network connections eliminates the need to change a password or credential associated with the primary network 302B, maintains the security of the primary network 302B and improves and enhances the QoE of a guest user under certain one or more network conditions.

Figure 4:
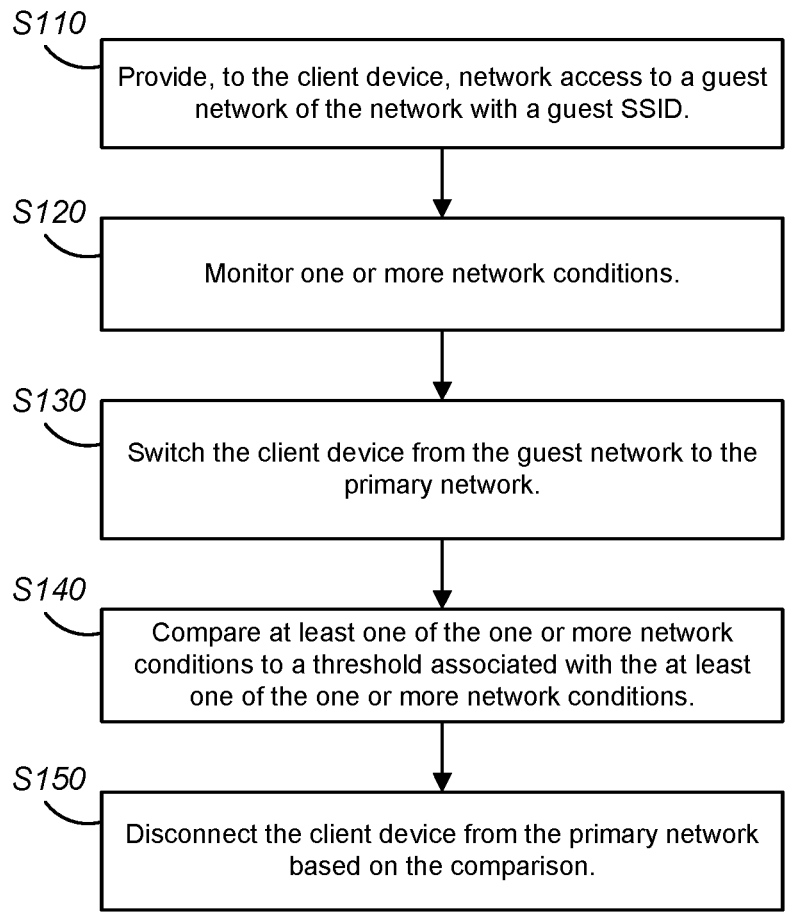
FIG. 4 is a flow chart illustrating a method for providing network access to a network, according to one or more aspects of the present disclosure.

FIG. 4 is a flow chart illustrating a method for providing at an access point device access control of an asset by a user of a client device, according to one or more aspects of the present disclosure.

An access point device 2, for example, of a system 100, may be programmed with one or more instructions (e.g., software 25 stored in memory 24) to perform one or more operations in one or more example embodiments. In FIG. 4, it is assumed that the devices and/or elements include their respective controllers and their respective software stored in their respective memories, as discussed above in connection with FIGS. 1, 2, 3A, 3B, and 3C which when executed by their respective controllers perform the functions and operations in accordance with one or more aspects of the present disclosure.

The access point device 2 comprises a controller 26 that executes one or more computer-readable instructions, stored on a memory 24, that when executed perform or cause the access point device 2 to perform one or more of the operations of steps S110-S150. In one or more embodiments, the one or more instructions can be one or more software or applications, for example, one or more software 25. While the steps S110-S150 are presented in a certain order, the present disclosure contemplates that any one or more steps can be performed simultaneously, substantially simultaneously, repeatedly, in any order or not at all (omitted).

Business network environments, home network environments, and public network environments, can restrict access to a primary network 302B to trusted users and/or network devices such that these users and network devices connect to a primary network so as to have priority to network resources over guest or visitors which are relegated to a guest network or lower priority connection. For example, in such network environments, a user of a client device 4 can install an application on the client device 4 so that the access point device 2 can automatically switch the client device 4 between a guest network 302A and a primary network 302B based, at least in part, one or more network conditions so as to improve the QoE for the guest user/network device without impacting the QoE of the trusted user/trusted device.

At step S110, the access point device 2 provides or provisions a client device 4 with access to a guest network 302A, of a network 302, with a guest SSID. For example, the user can bring the client device 4 within range of a network 302 such that the client device 4 identifies a guest SSID and a primary SSID associated with the network 302. As the user only has privileges, such as security or authentication credentials, for the guest network 302A, the client device 4 is only permitted to connect to the access point device 2, directly or indirectly, via the guest network 302A with the guest SSID.

At step S120, the access point device 2 can monitor one or more network conditions associated with the guest network 302A, the primary network 302B or both. For example, the access point device 2 can conserve resources by only monitoring the primary network 302B to determine, for example, whether network resources are such that additional network devices, such as client device 2, can be switched to the primary network 302B without impacting or affecting the QoE of existing primary network users/network devices. In another example, the access point device 2 can periodically monitor either or both of the guest network 302A and the primary network 302B. In another example, the access point device 2 can monitor only the guest network 302A and can determine to switch one or more network devices to the primary network 302B based on the one or more network conditions of the guest network 302B. In yet another example, the access point device 2 can monitor both the primary network 302B and the guest network 302A so as to perform a load balance that can, for example, be biased towards existing primary network users/network devices such that if the guest network 302A is determined to be overloaded while the primary network 302B is determined to have additional load capacity, the access point device can switch one or more network devices (such as client device 4) to the primary network 302B.

At step S130, the access point device 2 can switch the client device 4 from the guest network 302A to the primary network 302B based, at least in part, on the one or more network conditions monitored at step S120. For example, a guest SSID can have an associated guest SSID connection threshold that indicates a duration of connectivity required for a network device connected to the guest SSID of a guest network 302A. The access device 2 can compare the connection duration associated with the client device 4 with the connection threshold to determine to switch the client device 2 from the guest network 302A to the primary network 302B, such as when the access point device 2 determines that the connection duration is at, exceeds or both the connection threshold. Such a comparison and determination can be performed by the access point device 2 for any of the one or more network conditions to any one or more associated thresholds.

In one or more embodiments, the access point device 2 sends a message or instructions to an application of the client device 4 that causes the client device 4 to disconnect from the guest SSID of guest network 302A and connect to a primary SSID of a primary network 302B. The message can comprise one or more primary network credentials including, but not limited to, any of one or more primary network credentials, a password, a username, any other authentication or security credential, or any combination thereof. The message, for example, can (1) trigger a Wi-Fi protected setup (WPS) request on the client device 4 and/or extender access point device 3, (2) send an indication to the user through an application and a simple connect request using a native application program interface (API), or (3) a combination thereof.

In one or more embodiments, switching the client device 4 to the guest SSID of the guest network 302B comprises the access point device 2 providing the client device 4 with one or more features associated with the primary network 302. The one or more features can include, but are not limited to, any of a performance level, a priority level, a bandwidth level, a roaming level, a steering level, any other feature associated with primary network 302B, or a combination thereof. For example, the access device 2 can provide the client device 4 with any one or more of the one or more features such that the access device 2 can still subordinate client device 4 to other network devices connected to primary network 302B while providing client device 4 with an enhanced QoE.

At step S140, the access point device 2 compares at least one of the one or more network conditions associated with a guest network 302A and/or a primary network 302B to a threshold associated with the at least one of the one or more network conditions. For example, the access point device 2 can periodically compare the network activity or access level of a particular network and/or a particular client device 4 to an associated network activity threshold to determine whether the client device 4 is active on the primary network. Similarly, any of the one or more other network conditions can be periodically evaluated by the access point device 2 by comparing the network condition to a particular network and/or client device 4.

At step S150, the access point device 2 disconnects the client device 4 from the primary network 302B based on the comparison of step S140. In one or more embodiments, disconnecting the client device 4 comprises switching the client device 4 to a guest network 302A or disconnecting the client device 4 from the network 302. In one or more embodiments, the access point device 2 sends a message or instruction to the application on the client device 4 that causes the client device 4 to disconnect from the primary network 302B.

According to some example embodiments of inventive concepts disclosed herein, there are provided novel solutions for switching a client device from a guest network to a primary network based on one or more network conditions. Switching a client device to the primary network provides enhanced QoE for the user of the client device as the primary network provides better network performance. This is especially useful, for example, for guest users who are trusted users that need an enhanced network performance.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. An access point device of a network for providing network access to a client device comprising:
   a memory storing one or more computer-readable instructions; and
   a processor configured to execute the one or more computer-readable instructions to:
      provide, to the client device, network access to a guest network of the network with a guest simple service set identifier (SSID);
      monitor one or more network conditions, wherein the one or more network conditions comprise any of a connection duration, a roaming duration, a network load parameter, or a combination thereof, wherein the one or more network conditions are associated with a primary network with a primary SSID, the guest network, or both; and
   switch the client device from the guest network to the primary network based, at least in part, on at least one of the one or more conditions, wherein switching the client device from the guest network to the primary network comprises:
      providing the client device with one or more features associated with the primary network, wherein the one or more features comprise any of a performance level, a priority level, a bandwidth level, a roaming level, a steering level, or a combination thereof.

2. The access point device of claim 1, wherein the monitoring the one or more network conditions comprises monitoring the connection duration of the client device, wherein the guest SSID has an associated guest SSID connection threshold, and wherein the client device is switched based, at least in part on, a comparison of the guest SSID connection threshold and the connection duration.

3. The access point device of claim 1, wherein switching the client device from the guest network to the primary network comprises the processor configured to execute one or more further instructions to:
   send a message to an application of the client device to cause the client device to connect to the primary SSID of the primary network, wherein the message comprises one or more primary network credentials.

4. The access point device of claim 3, wherein sending the message triggers 1) a wireless fidelity (Wi-Fi) protected setup (WPS) request on the client device, an extender access point device, or both; 2) sends an indication to a user; or both.

5. The access point device of claim 1, wherein the network load parameter is indicative of a total number of client devices connected to the guest network, and wherein switching the client device from the guest network to the primary network is based, at least in part, on the network load parameter.

6. The access point device of claim 1, wherein the processor is configured to execute one or more further instructions to:
compare at least one of the one or more network conditions to a threshold associated with the at least one of the one or more network conditions; and
disconnect the client device from the primary network based, at least in part, on the comparison.

7. The access point device of claim 1, wherein the processor is configured to execute one or more further instructions to:
determine that the client device is a trusted device; and
wherein the client device is switched based, at least in part on, the determination that the client device is a trusted device.

8. A method for an access point device to provide a client device network access to a network, the method comprising:
providing, to the client device, network access to a guest network of the network with a guest simple service set identifier (SSID);
monitoring one or more network conditions, wherein the one or more network conditions comprise any of a connection duration, a roaming duration, a network load parameter, or a combination thereof, wherein the one or more network conditions are associated with a primary network with a primary SSID, the guest network, or both; and
switching the client device from the guest network to the primary network based, at least in part, on at least one of the one or more conditions, wherein switching the client device from the guest network to the primary network comprises:
providing the client device with one or more features associated with the primary network, wherein the one or more features comprise any of a performance level, a priority level, a bandwidth level, a roaming level, a steering level, or a combination thereof.

9. The method of claim 8, wherein the monitoring the one or more network conditions comprises monitoring the connection duration of the client device, wherein the guest SSID has an associated guest SSID connection threshold, and wherein the client device is switched based, at least in part on, a comparison of the guest SSID connection threshold and the connection duration.

10. The method of claim 8, further comprising:
sending a message to an application of the client device to cause the client device to connect to the primary SSID of the primary network, wherein the message comprises one or more primary network credentials.

11. The method of claim 10, wherein sending the message triggers 1) a wireless fidelity (Wi-Fi) protected setup (WPS) request on the client device, an extender access point device, or both; 2) sends an indication to a user; or both.

12. The method of claim 8, wherein the network load parameter is indicative of a total number of client devices connected to the guest network, and wherein switching the client device from the guest network to the primary network is based, at least in part, on the network load parameter.

13. The method of claim 8, further comprising:
comparing at least one of the one or more network conditions to a threshold associated with the at least one of the one or more network conditions; and
disconnecting the client device from the primary network based, at least in part, on the comparison.

14. The method of claim 8, further comprising:
determining that the client device is a trusted device; and
wherein the client device is switched based, at least in part on, the determination that the client device is a trusted device.

15. A non-transitory computer-readable medium storing a program for providing a client device access to a network, which when executed by a processor of an access point device, cause the access point device to perform one or more operations comprising:
providing, to the client device, network access to a guest network of the network with a guest simple service set identifier (SSID);
monitoring one or more network conditions, wherein the one or more network conditions comprise any of a connection duration, a roaming duration, a network load parameter, or a combination thereof, wherein the one or more network conditions are associated with a primary network with a primary SSID, the guest network, or both; and
switching the client device from the guest network to the primary network based, at least in part, on at least one of the one or more conditions, wherein switching the client device from the guest network to the primary network comprises:
providing the client device with one or more features associated with the primary network, wherein the one or more features comprise any of a performance level, a priority level, a bandwidth level, a roaming level, a steering level, or a combination thereof.

16. The non-transitory computer-readable medium of claim 15, wherein at least one of:
the guest SSID has an associated guest SSID connection threshold, and wherein the client device is switched based, at least in part on, a comparison of the guest SSID connection threshold and the connection duration; and
the network load parameter is indicative of a total number of client devices connected to the guest network, and wherein switching the client device from the guest network to the primary network is based, at least in part, on the network load parameter.

17. The non-transitory computer-readable medium of claim 15, wherein the program when executed by the processor causes the access point device to perform one or more further operations comprising:
sending a message to an application of the client device to cause the client device to connect to the primary SSID of the primary network, wherein the message comprises one or more primary network credentials.

18. The non-transitory computer-readable medium of claim 17, wherein sending the message triggers 1) a wireless fidelity (Wi-Fi) protected setup (WPS) request on the client device, an extender access point device, or both; 2) sends an indication to a user; or both.

19. The non-transitory computer-readable medium of claim 15, wherein the program when executed by the processor causes the access point device to perform one or more further operations comprising:
comparing at least one of the one or more network conditions to a threshold associated with the at least one of the one or more network conditions; and
disconnecting the client device from the primary network based, at least in part, on the comparison.

20. The non-transitory computer-readable medium of claim 15, wherein the program when executed by the processor causes the access point device to perform one or more further operations comprising:
   determining that the client device is a trusted device; and
   wherein the client device is switched based, at least in part on, the determination that the client device is a trusted device.

\* \* \* \* \*